S. PARKER.

MACHINE FOR SHAVING HOOPS.

No. 6,842. Reissued Jan. 4, 1876.

Witnesses.
James L. Kray
James K. Bakewell

Inventor
Stillman Parker
by Bakewell & Herr
Attys.

N. PETERS, PHOTO-LITHOGRAPHER, WASHINGTON, D. C.

UNITED STATES PATENT OFFICE.

STILLMAN PARKER, OF ALTOONA, PENNSYLVANIA.

IMPROVEMENT IN MACHINES FOR SHAVING HOOPS.

Specification forming part of Letters Patent No. 107,622; dated September 20, 1870; reissue No. 6,842, dated January 4, 1876; application filed October 11, 1875.

*To all whom it may concern:*

Be it known that I, STILLMAN PARKER, of Altoona, in the county of Blair and State of Pennsylvania, have invented a new and useful Improvement in Machines for Shaving Hoops; and I do hereby declare the following to be a full, clear, and exact description thereof, reference being had to the accompanying drawing, forming a part of this specification, in which—

Figure 1:
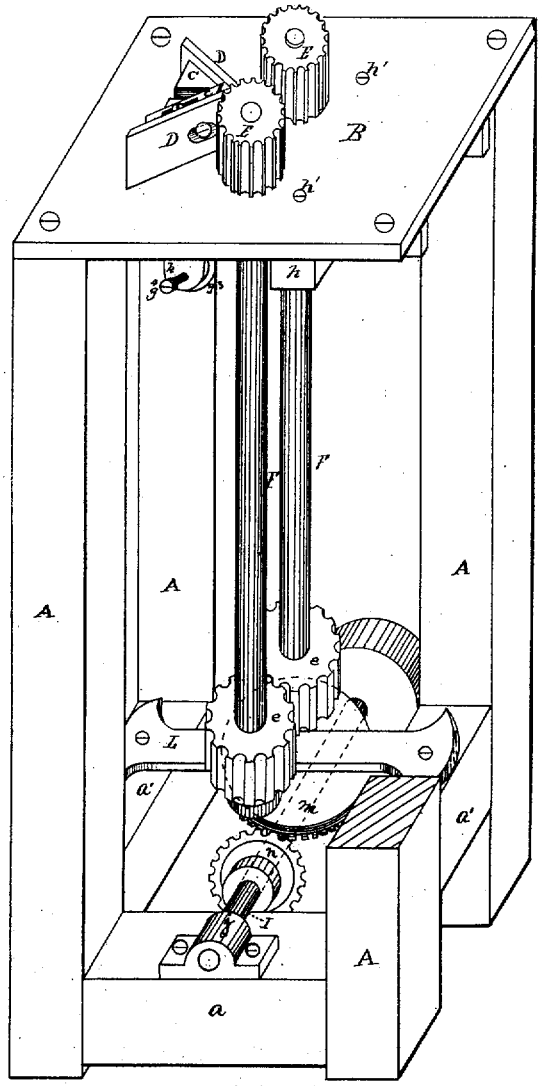
Figure 2:
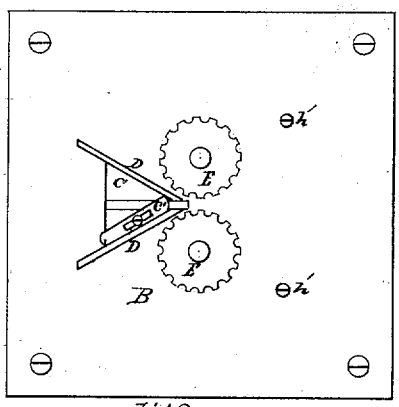
Figure 3:
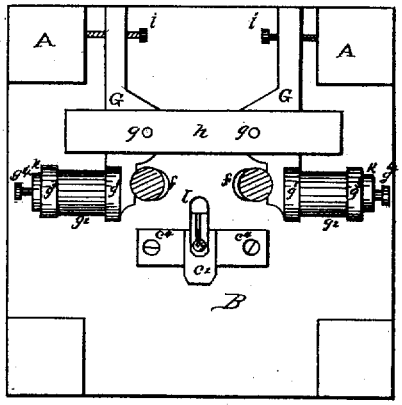

Figure 1 is a perspective view of my invention, with one of the legs or uprights of the frame removed. Fig. 2 is a plan view of the same; Fig. 3, an under-side view of the plate or top of the machine.

Like letters refer to like parts wherever they occur.

My invention relates to that class of machines used for the purpose of shaving hoops for barrels, casks, &c.

I will now proceed to describe my invention, so that others skilled in the art may apply the same.

The construction, operation, and relative arrangement of the component parts of my invention, are as follows:

A A represent four uprights or legs, firmly braced together at their lower ends by means of the transverse supports *a a'*, and supporting at their upper ends the metallic plate or table B, which is screwed down thereon. Screwed or formed on the said table is a triangular-shaped metallic block, C, having a slot of suitable width and depth extending through its entire length, or from its apex to its base, to allow the hoop being shaved to pass through it. A knife, *c*, constructed similarly to the ordinary plane-bit, and provided with an elongated slot, is located upon the upper side of the block C, near one edge of its inclined portion, with its cutting-surface resting directly over the slot cut in the said block C, in such a manner as to come in contact with the upper edge of the hoop on its first entering said slot. By means of the screw *c'* passing through the elongated slot of knife *c*. and entering the block C, the said knife may be adjusted at any desired point, or removed for sharpening or renewal, when required. D D represent two other knives, made similarly to knife *c*, but in larger dimensions, with elongated slots, through which pass set-screws *d d*, and resting against the conically-shaped portion or inclined sides of the block C, the sides of said knives being at right angles with the upper surface of the table or plate B. These knives are for the purpose of shaving the sides of the hoop. Situated directly in front of the knives D D, and in close proximity therewith, are the fluted or corrugated rollers E E, secured upon the vertical shafts F F, passing through elongated slots *f f* cut in the plate B, (see Figs. 2 and 3,) and having attached to their lower ends pinions or cogs *e*, gearing into each other. By means of the elongated slots *f f* it will be seen that the upper ends of the shafts F, carrying the fluted rollers E, may be laterally adjusted, in the manner hereinafter described, for the purpose ot placing the said rollers nearer or farther apart, in order to receive hoops of any desired thickness which are to be shaved. The rollers E are designed for the purpose of feeding the work to be performed to the knives aforesaid, their teeth or corrugations, while being revolved, grasping the work and carrying it forward to its proper destination. G G designate two levers, having their fulcrums at the points *g g*, the pivots of which are made to enter the under side of the table or plate B at one end, and recesses cut in the upper side of a pendant or support, *h*, secured to the said plate or table, at the opposite end. The right-angular ends of the said pendant are provided on their upper surfaces with female screws for the reception of the male screws *h' h'*, which pass through apertures cut in the plate B. The outer ends of the levers G G are supplied with set-screws *i i*, whose inner end enters the uprights A, the outer ends of which, being supplied with square heads by means of which the said screws may be operated or rotated, causing the levers G to be pressed against the shafts F, or released therefrom, according to the directions given to the said screws in revolving the same. The inner ends of the said levers are recessed or made concave, in order to suit the curvilinear surface of the vertical shafts F, against which they bear, and also formed thereat with semicircular shoulders $g^1$ $g^1$, against which presses one end of the horizontal cylindrical rubber pieces or springs $g^2$ $g^2$, the opposite ends of said springs being retained in position by means of metallic circular plates $g^3$ $g^3$. The screws $g^4$ $g^4$ are for the purpose of giving the required tension to the springs $g^2$ $g^2$, and pass through lugs or projections $k$ $k$, secured to the lower side of the table B. The object of the springs $g^2$ $g^2$ is to allow the shafts F to yield laterally, causing their fluted rollers to automatically adjust themselves to the size of the work to be performed. $l$ designates a slot of a suitable length, cut in the table B, into which is inserted in an inclined position, the lower knife $c^2$, for shaving the lower edge of the hoop. The upper end of said knife is made to extend upward through its slot and project a short distance beyond the same, so as to come in contact with the edge of the hoop to be shaved, and the lower end thereof is supplied with an elongated slot, through which passes a set-screw, $c^3$, entering a beveled slot cut in a removable block, $c^4$, screwed to the under side of table B. L designates a metallic transverse plate or support screwed down to the cross-pieces $a'$ $a'$ of frame or uprights A, and constructed with two small semicircular projections, one of which is partially shown in the drawing, for the purpose of receiving and forming bearings for the lower ends of the vertical shafts F, one of said shafts being made to extend below the support L, in order to receive a beveled horizontal gear-wheel, $m$. The beveled gear-wheel $m$ engages with a correspondingly-beveled pinion, $n$, located upon the transverse horizontal shaft I, having its bearings in journal-boxes $j$ $j$, screwed down to the cross-pieces $a$ $a$ of uprights A. Situated upon the projecting end of shaft I is a pulley, around which is designed to be passed a driving-belt, connected with the machinery for operating the same, imparting motion to the said pulley, and the various parts of the machine to be operated.

Having thus described my invention, what I claim, and desire to secure by Letters Patent, is—

1. In a hoop shaving-machine, the combination of the pair of feed-rolls, the pair of converging side planes, and the pair of edging-tools, substantially as described.

2. In a machine for shaving hoops, the combination of the pair of feed-rolls provided with the pressure-springs, the adjustable converging side planes, and the edging-tools, substantially as described.

In witness whereof, I, the said STILLMAN PARKER, have hereunto set my hand.

STILLMAN PARKER.

Witnesses:

JOSIAH SIBLEY,

C. L. WALLIS.